United States Patent Office 2,987,517
Patented June 6, 1961

---

2,987,517
ALPHA ARYL-3-METHYL-PENTANOIC ACID-N-LOWER ALKYL HETEROCYCLIC ESTERS
Henry Martin, Zurich, and Ernst Habicht, Schaffhouse, Switzerland, assignors to Cilag Chemie Limited, a corporation of Switzerland
No Drawing. Filed Nov. 26, 1954, Ser. No. 471,500
Claims priority, application Germany Apr. 20, 1954
6 Claims. (Cl. 260—293.4)

This invention relates to novel basic esters, their acid salts, quaternary salts and N-oxides, and to processes for the manufacture of these compounds.

In accordance with the present invention, the new esters may be generally designated by the following structural formula:

(I) 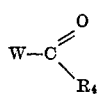

wherein W is an aralkyl radical selected from the class consisting of (II) 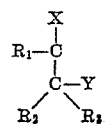

and (III) 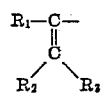

wherein $R_1$ is a cyclic radical, $R_2$ and $R_3$ are lower alkyl radicals, X is selected from the group consisting of hydrogen and an hydroxyl radical, Y is hydrogen and $R_4$ is the alcoholic residue selected from the class consisting of basic amino alcohols and basic amino thio alcohols. Included within the scope of the present invention are the acid salts, quaternary salts, and N-oxides of said esters. In the above formula, X together with Y may represent a carbon to carbon linkage, as evidenced by the double bond in structural formula III.

The cyclic radical represented by $R_1$ may be a substituted or unsubstituted phenyl, cyclohexyl, or thionyl group; suitable substituents being for example a hydroxyl, alkoxy, alkyl or halogen group.

More particularly, in the above formula, $R_2$ represents a methyl or ethyl radical; and $R_3$ represents an ethyl, propyl or butyl radical.

Examples of basically substituted amino alcohols or the corresponding thio alcohols from which $R_4$ in the above formula may be derived are the following groups:

(1) Monoalkylamino alkanols, dialkylamino alkanols, their quaternary salts and N-oxides.

(2) N-pyrrolidino-, N-piperidino-, C-alkyl piperidino-, N-morpholino-alkanols and salts.

(3) N-alkyl pyrrolidinols and N-alkyl piperidinols as well as the corresponding carbinols and salts.

(4) Dialkyl amino cycloalkanols.

It has heretofore been known that α-alkyl and α-alkenyl-phenyl acetic acid esters or basic amino alcohols having the formula (IV) 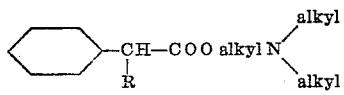

wherein R is $C_3H_7$, are effective as spasmolytic agents. The prior art has also shown that where R is a butyl or amyl radical, the compound is not as effective as a spasmolytic.

Basic esters of acids having the formula:

(V) 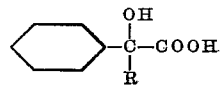

wherein R is a butyl, isobutyl, amyl, hexyl and heptyl radical, have also been found to have some spasmolytic activity. Consequently, the specificity of compounds for use as spasmolytics has been clearly shown by the teachings in the prior art.

It has now been found that testers of formula I and their salts are far superior spasmolytics with regard to both increased activity and compatability as well as excellent analgesics whereas prior art compounds possessed little or no analgesic activity. A theoretical explanation for the increased spasmolytic and unusual analgesic activity resides in the branching at the first carbon atom of the side chain. The unexpected results due to the substitution of a tertiary carbon on the α-carbon atom of the acid chain, in lieu of the normal or iso-alkyl radical of the prior art is clearly shown by the following table, wherein a comparison is made of the toxicities of the neurotropic and musculotropic spasmolytic activity of basic esters of the general formula:

(VI) 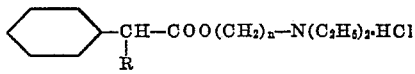

wherein R is varied in accordance with column 1, and $n$ is either two or three. . . .

| R | $n$ | Ratio of the doses of the product to those of papaverine (or atropine), which have the same effect against— | | Toxicity LD 50 in mg.: 20 g. |
|---|---|---|---|---|
| | | BaCl | Acetyl choline | |
| —CH₃ | 2 | 7.6 | 88 | 12.0 |
| —CH₃ | 3 | 2.6 | 170 | 3.5 |
| —C₂H₅ | 2 | 2.5 | 41 | 8.0 |
| —C₂H₅ | 3 | 2.4 | 41 | 3.5 |
| —C₃H₇(n) (Propivan) | 2 | 1.3 | 14 | 5.0 |
| —C₃H₇(n) | 3 | 1.7 | 15 | 1.0 |
| —C₃H₇(i) | 2 | 3.9 | 14 | 3.7 |
| —C₃H₇(i) | 3 | 1.5 | 10 | 2.5 |
| —C₄H₉(n) | 2 | 1.1 | 20 | 3.7 |
| —C₄H₉(n) | 3 | 1.1 | 15 | 7.5 |
| —CH₂CH(CH₃)₂ | 2 | 1.4 | 13.5 | 3.7 |
| —CH₂CH(CH₃)₂ | 3 | 1.5 | 12 | 1.7 |
| —CH(CH₃)CH₂CH₃ | 2 | 0.91 | 6.6 | 8.7 |
| —CH(CH₃)CH₂CH₃ | 3 | 0.60 | 5.8 | 7.5 |
| —C₅H₁₁(n) | 2 | 1.3 | 30 | 1.75 |
| —C₅H₁₁(n) | 3 | 1.5 | 29 | 2.5 |
| —CH₂CH₂CH(CH₃)₂ | 2 | 1.2 | 21 | 3.7 |
| —CH₂CH₂CH(CH₃)₂ | 3 | 1.3 | 21 | 2.0 |
| —CH(CH₃)CH₂CH₂CH₃ | 2 | 0.95 | 23 | 3.7 |
| —CH(CH₃)CH₂CH₂CH₃ | 3 | 1.1 | 22 | 1.75 |
| —CH₂—CH=CH₂ | 2 | 1.9 | 32 | 15.0 |
| —CH₂—CH=CH₂ | 3 | 2.6 | 28 | 3.7 |
| —Cyclohexyl | 2 | 1.7 | 4.1 | 5.0 |
| —Cyclohexyl | 3 | 0.69 | 6.3 | 1.75 |

This table clearly discloses the unusual spasmolytic activity of the novel compounds. More specifically, the underlined examples which are the tertiary substituents of the present invention, exhibit a considerably lesser degree of toxicity as well as the use of a considerably smaller dosage to produce the desired spasmolytic effect.

The novel basic esters represented by formula I may be prepared in any suitable manner. It has been found that these novel products may generally be prepared by reacting a basic amino alcohol or corresponding thio-alcohol with an acid represented by the formula:

(VII)
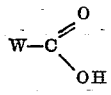

wherein W has the same meaning as in formula I. In lieu of the acid represented by formula VII, a reactive functional derivative thereof may be used, such as the halide, alkyl ester, aryl ester, nitrile, ketone, anhydride or mixed anhydride selected from the class consisting of sulfates, carbonates, and phosphates. The basis ester obtained above may be transformed into the acid salt or quaternary salt by reacting with an alkyl, aralkyl or alkenyl halide or sulfate, or aralkyl or aryl sulphonate. The N-oxide derivative of the acid ester may be obtained by the use of oxidizing agents such as peracetic acid, benzo-per-acid or hydrogen peroxide.

Another method of preparing the basic esters of the present invention comprises reacting a reactive ester of the basic amino alcohol or corresponding thio alcohol with the acid of formula VII or its salt. The quaternary salts or the N-oxides of the esters of formula I may be directly prepared by the use of a quaternary salts or N-oxides of the reactive esters of the basic amino alcohols.

Still another method of obtaining the novel basic esters represented by formula I comprises reacting a primary or secondary base with acid esters having the formula:

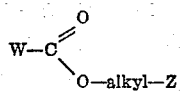

wherein W has the same meaning as in formula I, and Z is a radical which can be easily split off such as a halogen atom, an alkyl or aryl-sulphonoxy radical. If a tertiary base is used as the alcoholic reactant, the quaternary salt of the ester is directly obtained.

In the production of novel esters, wherein X represents the hydroxy group, functional reactive derivatives of acids of formula V containing the hydroxy group in protected form may be reacted with a basically substituted alcohol, and thereafter the protected hydroxy group is converted into the free hydroxy group. The hydroxy group in the acid of formula V may be protected by a radical capable of splitting off by hydrolysis or hydrogenolysis or the like upon completion of the ester reaction. Suitable protecting radicals are halocarboxylic acid esters, alkyl- or aryl- sulphonic acid halides, acyl or aroyl halides, benzyl, benzhydryl, carbobenzoxy radicals. These protecting radicals can readily be split off from the formed basic ester by alkali or acid hydrolysis or by catalytically activated hydrogen (i.e. using Pd catalysts).

A simpler method of producing esters of such hydroxy acids comprises the direct reaction of a reactive ester of a basically substituted alcohol with an acid of formula V.

It is obviously also possible to react mono-substituted amino alcohols instead of di-substituted amino alcohols, or react the said acids with amino alcohols which are twice substituted in the amino group, the second substituent being a radical adapted to be split off by hydrogenolysis, and then to split off this radical by hydrogenolysis from the basically substituted ester which is obtained.

In a similar manner, the above-described reaction of haloalkyl esters with dialkyl amines may be appropriately modified by mono-alkyl amines being used instead of dialkyl amines, or by using mono-alkyl benzyl amines or mono-alkyl benzhydryl amines, the group adapted to be split off by hydrogenolysis being removed in the manner already described. The esterification methods remain basically the same as those described above.

If a di-substituted amino alcohol is used, the second radical adapted to be split off by hydrogenolysis may be selected, for example, from the following: benzyl radical, benzhydryl radical, trityl radical, carbobenzoxy radical. The hydrogenolytic elimination of one of these radicals is preferably carried out with catalytically activated hydrogen. Palladium black, palladium carbon (with thioesters: molybdenum sulphides, etc.) may be used as catalysts. The salts of the basic esters, for example the hydrochlorides, are advantageously subjected to the hydrogenolytic treatment.

The following examples are further illustrative of these novel compounds and their preparation, and it will be understood that the invention is not limited thereto.

*Example 1.*—2-phenyl-3-methyl-pentanoic acid-(1)-3'-diethylamino-propyl ester: From 30 gm. of 2-phenyl-3-methyl-pentanoic acid and 45 gm. of thionyl chloride, the chloride is prepared by boiling the methyl in 100 cc. of absolute toluene, partially distilling off the solvent, replenishing the toluene, distilling again and making up with ether. This chloride is combined with a solution of 25 gm. of 3-diethylamino-propanol in 25 cc. of absolute pyridine. The mixture is allowed to stand for 24 hours, is then mixed with ice and 200 cc. of 2 N-acetic acid, thoroughly shaken and the aqueous layer is separated. This layer is made strongly alkaline with potassium carbonate solution and then shaken with ether. The ether solution is washed with water, dried with sodium sulphate and evaporated. The residue is distilled under high vacuum, yielding 29 gm. of basic ester, which represents a yield of 61% of the theoretical amount. The final ester has a boiling point of 110–112° C. at a pressure of 0.04 mm. The hydrochloride thereof melts at 116–117° C. and is obtained by mixing an etheral solution of the ester with ethereal hydrochloric acid and precipitating the crystals which are obtained from the acetone-ether mixture. It dissolves readily in water at pH 6, ethanol, acetone, acetic ester, and dissolves slightly in ether and petroleum ether.

*Example 2.*—2-phenyl-3-methyl-pentanoic acid-(1)-2'-diethylamino-ethyl ester: 24 gm. of 2-phenyl-3-methyl-pentanoic acid-1-methyl ester are heated for one hour at 175–185° C. with 30 gm. of 2-diethyl-aminoethanol and 0.5 gm. of sodium methylate. The excess diethylaminoethanol is removed in vacuo, the residue is dissolved in residue is dissolved in 300 cc. of 2 N-acetic acid, the acid solution is shaken with ether and made alkaline with concentrated potassium carbonate solution and ice. It is further treated as described in Example 1. A yield of 20–21 gm. of the basic ester (60% of the theoretical) is obtained, said ester boiling at 98–100° C. at a pressure of 0.03 mm. The hydrochloride of the ester melts at 112–113° C. and the methobromide at 100–101° C.

*Example 3.*—The ester described in Example 2 may also be prepared in the following manner:

1 mol of phenyl-sec.butyl ketone in four times the amount of benzene is mixed with 1 mol of diethylaminoethanol. The mixture is allowed to stand for 24 hours, dilute acetic acid is then added and the mixture thoroughly shaken. The acetic acid solution is thereafter washed with ether, made alkaline with concentrated potassium carbonate solution and the oily layer decanted, said oil layer is mixed with ether. After drying and distilling off the ether, the residue is distilled under high vacuum. An average of 65–70% of the theoretical yield of the required basic ester is obtained.

*Example 4.*—3-methyl-2-phenyl-pentanoic acid-(1)-3'-morpholino-propyl ester: 30 gm. of 3-methyl-2-phenyl-pantanoic acid-1, 28 gm. of N(3-chloropropyl)-morpholine, 20 gm. of sodium carbonate and a trace of sodium iodide are heated together in 100 cc. of absolute isopropanol for 14½ hours to the boiling point. The inorganic salts which are formed are filtered off with suction, the isopropanol is evaporated at 50° C. and the residue is dissolved in 200 cc. of water and 100 cc. of 2 N-hydrochloric acid. The further processing is carried out as indicated in the preceding examples. In this manner, there are obtained 37.2 gm. of basic ester (74.7% of the theoretical) which boils at 135–138° C. at a pressure of 0.002 mm. The hydrochloride thereof melts at 120–122° C.

*Example 5.*—In the same manner as described above, the 3-pyrrolidino-propyl ester is obtained with a yield of 70% as a colourless oil boiling at 120–122° C. at a pressure of 0.002 mm. The hydrochloride thereof melts at 96.5–98° C. and the methobromide at 84.5–86° C.

*Example 6.*—3-methyl-2-phenyl-pentanoic acid-(1)-3'-piperidino-propyl ester-bromomethylate: 15.7 cm. of 3-methyl-2-phenyl-pentanoic acid-(1)-3'-piperidino-propyl ester are dissolved in 250 cc. of absolute ether. 24 gm. of methylbromide are introduced into this solution while cooling with ice. The quaternary salt separates out as an oil and crystallizes after a period of time, and may be recrystallized from acetone by the addition of ether. 12.7 gm. of the bromomethylate (62% of the theoretical) are obtained, having a melting point of 124–126° C.

*Example 7.*—3-methyl-2-phenyl-pentanoic acid-(1)-2'-ethyl-amino-ethyl ester: 3-methyl-2-phenyl-pentanoic acid-2'-bromoethyl ester is reacted with ethylamine in benzene or dioxane.

*Example 8.*—The ester of Example 7 may also be prepared by 1 mol of 3-methyl-2-phenyl-pentanoic acid-(1)-chloride is reacted with N-benzyl-N-ethyl-amino-ethanol to form the basic ester which boils at 151–152° C. at a pressure of 0.01 mm. 8 gm. of 3-methyl-2-phenyl-pentanoic acid - (1) - N - ethyl - N - benzylamino - ethyl ester (0.0226 mol.), 12.6 cc. of alcoholic HCl, 50 cc. of absolute ethanol and 4 gm. of 5% Pd-charcoal are thereafter hydrogenated in an agitator. After 5–10 minutes, the absorption of hydrogen is completed. The catalyst is filtered off with suction and the filtrate is concentrated in vacuo to a few cc. It is then mixed with 25 cc. of ether and, after adding 75 cc. of petroleum ether (30–45° C.), the precipitate which is formed is filtered off by suction. Melting point: 119–124° C.; 2.5 gm.; dissolved and reprecipitated from benzene/ether, melting point 125–128° C.; yield: 30% of the theoretical of hydrochloride. Cl calculated: 11.83%, Cl found: 11.76%.

The ether-petroleum ether filtrate is concentrated. The residue is dried in a desiccator, then dissolved in a little acetone and precipitated with ether. Melting point: 92–96° C., 3.6 gm. reciprocated from benzene/ether, melting point: 100–101° C., 3 gm.=45% of the theoretical, again reprecipitated from benzene/ether, melting point: 100–102° C., 2.5 g.: Cl calculated 11.83%, Cl found 11.72%. The primarily precipitated crystals and the constituents obtained from the filtrate clearly represent substituents of two stereoisomeric forms.

*Example 9.*—3-methyl-2-phenyl-pentene-(2)-acid-(1)-2'-diethyl-aminoethyl ester: 15 gm. of 3-methyl-2-phenyl-pentene-(2)-acid-(1), 10.8 gm. of diethyl aminoethyl chloride and 60 cc. of absolute isopropanol are boiled together for seven hours in a reflux condenser. It is thereafter concentrated in vacuo, and the residue is extracted with 100 cc. of ether and then twice with dilute acetic acid. The combined acid aqueous solutions are washed with ether and the ester separated out is taken up in ether after adding concentrated potassium carbonate solution. The ether solution is dried, then evaporated and the residue distilled under high vacuum. The basic ester is obtained as a colorless oil boiling at 107–109° C. under a pressure of 0.004 mm. The quantity recovered is 13.2 gm. which corresponds to a yield of 58%.

Hydrochloride: Reprecipitated from benzene/ether: melting point: 108–110° C. white crystalline substance. Readily soluble in water, ethanol, acetone and chloroform.

Methobromide: Prepared from the ester with methyl bromide in acetic ester: melting point: 95–97° C.

*Example 10.*—2-hydroxy-2-phenyl-3-methyl-pentanoic acid-(1)-2'-diethylaminoethyl ester: 9 gm. of 2-hydroxy-2-phenyl-3-methyl-pentanoic acid are boiled for two hours in a reflux condenser in 100 cc. of isopropanol with 6.8 gm. of diethyl aminoethyl chloride. The hydrochloride of the ester which is formed crystallises out on cooling. After some hours it is filtered by suction and recrystallised from 90 cc. of isopropanol. In this manner there are obtained 12.2 gm. (81% of the theoretical) of hydrochloride, which melts at 167–168° C. The free basic ester may be prepared from this hydrochloride by mixing with sodium carbonate solution. The bromomethylate may be prepared from the basic ester by reacting with methylbromide in ether. Recrystallised from acetone/ether, this substance melts at 142–143° C.

*Example 11.*—2-hydroxy-2-phenyl-3-methyl-pentanoic acid-(1)-3'-diethylaminopropyl ester: This is prepared in a manner similar to Example 10, and the hydrochloride thereof melts at 116–117° C. and the bromomethylate thereof at 127–128° C.

*Example 12.*—3-methyl-2-phenyl-pentanoic acid-(1)-2'-diethyl-aminoethylthiol ester: 25 gm. of 3-methyl-2-phenyl-pentanoic acid-(1)-chloride are introduced into a solution of 17.5 gm. of 2-diethylaminoethane thiol in 100 cc. of benzene. The substance is allowed to stand for one day, it is then boiled for half an hour on a water bath and cooled. It is diluted with ether, the two layers which are formed are separated and the benzene-ether layer is extracted with water. The lower layer and the water extract are combined and made alkali with potash solution. The oil separating out is taken up in ether, and the ether solution is dried and then evaporated. The residue is fractionated under high vacuum. The thiol ester is obtained as a slightly reddish oil boiling at 117–120° C. under a pressure of 0.01 mm., this oil being obtained in an amount of 29–30 gm., i.e. about 80% of the theoretical. The hydrochloride of the thiol ester, reprecipitated from acetone/ether, melts at 116–119° C. and the methobromide somewhat indefinitely between 100 and 120° C.

*Example 13.*—3-methyl-2-phenyl-pentanoic acid-(1)-3'-diethylaminopropylthiol ester: In the same manner as described in Example 12, the thiol ester is obtained from 25 gm. of acid chloride and 19.3 gm. of diethylaminopropane thiol in 100 cc. of benzene. The formed ester is a colorless liquid which boils at 125° C. at a pressure of 0.05 mm. The hydrochloride of the ester forms a crystalline powder melting at 89–91° C. when reprecipitated from acetic ester-ether.

*Example 14.*—The ester described in Example 13 is also formed if 30 gm. of acid phenyl ester are boiled for several hours at 120–130° C. with 75–80 gm. of diethylaminopropane thiol in the presence of sodium methylate.

*Example 15.*—2-phenyl-3-methyl-pentanoic acid-(1)-2'-diethylaminoethyl ester-N-oxide: A. 20.4 gm. of 2-phenyl-3-methyl-pentanoic acid-diethylaminoethyl ester, 100 cc. of pure $CHCl_3$.

B. 13.7 gm. of benzo per-acid (determined by a titrimeter), 295 cc. $CHCl_3$.

Solution A is cooled to 0° C. and, while being cooled with ice, is mixed at 0–10° C. over a period of twenty minutes with the ice-cooled solution B. The mixture is stored for four weeks in a refrigerator at −10° C. It is then shaken with 300 cc. of half-saturated soda solution. The $CHCl_3$ layer is dried with soda in solid form and is evaporated to dryness in vacuo. The residue is dissolved in 120 cc. of absolute ether, filtered off from a small amount of sodium benzoate and again evaporated to dryness in vacuo. The residue is brownish, thickly viscous and soluble in water.

The substance is further purified by continuous countercurrent washing with 400 cc. of 90% methanol and 600 cc. of low-boiling petroleum ether in a column comprising clay Raschig rings. The petroleum ether layer is rejected; the methanol layer is filtered with carbon and evaporated to dryness in vacuo at below 40° C. The residue is dissolved in 100 cc. of absolute ether, the solution is filtered and the filtrate evaporated to dryness in vacuo.

The residue is an oil which is further purified several times by means of the counter-current washing.

In this manner, the N-oxide is obtained in pure white crystals which melt between 95 and 96° C.

$C_{18}H_{29}O_3N$, mol. wt. 307.3, Calc.: C 70.43 H 9.53 N 4.57%. Found: C 70.73 H 9.71 N 4.71%

The novel N-oxide dissolves readily in water, alkalis, acids and all organic solvents apart from cold ether and petroleum ether. The aqueous solution thereof has only a slight alkaline reaction (pH 8–9), and neutrality is obtained with addition of exactly 1 mol. of N-HCl.

In a manner analogous to that described in the preceding examples, it is also possible to produce the following esters of 2-phenyl-3-methyl-pentanoic acid-(1):

2′-dimethylaminoethyl-, B.P. 11 mm.: 164–166° C.; M.P. of the hydrochloride 97–98° C., of the methobromide 113° C.

2′-di-isopropylaminoethyl-, B.P. 0.015 mm.: 123–125° C.; M.P. of the methobromide 144–146° C.

2′-pyrrolidinoethyl-, B.P. 10 mm.: 192–194° C.; M.P. of the hydrochloride 114° C., of the methobromide 70° C.

2′-piperidinoethyl-, B.P. 0.005 mm.: 125–127° C.; M.P. of the hydrochloride 117° C., of the methobromide 113° C.

2′-lupetidinoethyl-, B.P. 0.003 mm.: 128–140° C.; M.P. of the hydrochloride 86–78° C., of the methobromide 124–126° C.

2′-morpholinoethyl-, B.P. 0.01 mm.: 130–131° C.; M.P. of the hydrochloride 115–17° C., of the methobromide 114–116° C.

3′-dimethylaminopropyl-, B.P. 0.001 mm.: 90–92° C.; M.P. of the hydrochloride 110.5–112° C. of the methobromide 109–111° C.

3′-diisopropylaminopropyl-, B.P. 0.003 mm.: 102–105° C.

3′-piperidinopropyl-, B.P. 0.002 mm.: 120–122° C.; M.P. of the hydrochloride 124–126° C. of the methobromide 124–126° C.

3′-lupetidinopropyl-, B.P. 0.005 mm.: 134–136° C.; M.P. of the hydrochloride 120–122° C.

2′-diethylaminopropyl-, B.P. 10 mm.: 183–185° C.; M.P. of the methobromide 75–76° C.

3′-diethylaminopropyl-(2′)-, B.P. 10 mm.: 175–177° C.; M.P. of the hydrochloride 55° C.

4′-diethylaminobutyl-, B.P. 0.001 mm.: 103–105° C.

5′-diethylaminopentyl-, B.P. 0.01 mm.: 127–129° C.

3′-diethylamino-2′,2′-dimethylpropyl-, B.P. 0.01 mm.: 102–105° C.; M.P. of the methobromide 112–116° C.

3′-diethylamino-2′,2′-dimethylpropyl-, B.P. 0.005 mm.: 115–116° C.

3′-pyrrolidino-2′,2′-dimethylpropyl-, B.P. 0.005 mm.: 111–113° C.; M.P. of the methobromide not sharp 60–70° C.

3′-piperidino-2′,2′-dimethylpropyl-, B.P. 0.01 mm.: 135–137° C.

3′-morpholino-2′,2′-dimethylpropyl-, B.P. 0.01 mm.: 138–141° C.

5′-diethylamino-pentyl-(2′)-, B.P. 0.005 mm.: 112–133° C.

2′-diethylaminoethoxyethyl-, B.P. 0.002 mm.: 137–139° C.

1′-methyl-pyrrolidyl-(3′)-, B.P. 0.01 mm.: 124–125° C.; M.P. of the methobromide 114–116° C.

1′-ethyl-pyrrolidyl-methyl-(3′)-, B.P. 0.015 mm.: 131–133° C.

1′-methyl-piperidyl-(3′)-, B.P. 0.005 mm.: 105–108° C.; M.P. of the methobromide 91–93° C.

1′-ethyl-piperidyl-(3′)-, B.P. 0.01 mm.: 121–124° C.

1′-methyl-piperidyl-(4′)-, B.P. 0.05 mm.: 102–104° C.; M.P. of the hydrochloride 85–86° C., of the methobromide 138–140° C., of the methosulfate 110–112° C.

1′-ethyl-piperidyl-(4′)-, B. P. 0.005 mm.: 114–116° C.; M.P. of the hydrochloride 99–102° C., of the methobromide not sharp between 80 and 100° C.

1′-dimethylamino-cyclohexyl-(2′)-, B.P. 0.007 mm.: 120–122° C.; M.P. of the hydrochloride 164° C., of the methobromide 143° C.

1′-diethylamino-cyclohexyl-(2′)-, B.P. 0.005 mm.: 129–132° C.

The following esters of 2-phenyl-3-ethyl-pentanoic acid can be produced in analagous manner:

2′-diethylaminoethyl ester, B.P. 0.02 mm.: 101–103° C.; M.P. of the hydrochloride 109.5–111° C., of the methobromide 134–136° C.

3′-diethylaminopropyl ester, B.P. 0.02 mm.: 112–115° C.; M.P. of the hydrochloride 129–131° C., of the methobromide 105–107° C.

The following esters of 2-phenyl-3-methyl hexanoic acid can be produced in analogous manner:

2′-diethylaminoethyl ester, B.P. 0.05 mm.: 109–111° C.; M.P. of the hydrochloride 96–97° C., of the methobromide 120–121° C.

3′-diethylaminopropyl ester, B.P. 0.04 mm.: 111–113° C.; M.P. of the hydrochloride 112–113° C.

The following esters of 2-cyclohexyl-3-methyl-pentanoic acid can be produced in analogous manner:

2′-diethylaminoethyl ester, B.P. 0.008 mm.: 105–107° C.; M.P. of the hydrochloride 123–124° C., of the methobromide 122–125° C.

3′-diethylaminopropyl ester, B.P. 0.01 mm.: 124–126° C.; M.P. of the hydrochloride 125–126° C., of the methobromide 100–102° C.

The following esters of 2-(2′-methylphenyl)-3-methyl-pentanoic acid can be produced in analogous manner:

2′-diethylaminoethyl ester, B.P. 0.04 mm.: 106–108° C.; M.P. of the hydrochloride 117–119° C.

3′-diethylaminopropyl ester, B.P. 0.04 mm.: 115–118° C.; M.P. of the hydrochloride 125–127° C.

The following esters of 2-(2′-methylphenyl)-3-methyl hexanoic acid can be produced in analogous manner:

2′-diethylaminoethyl ester, B.P. 0.03 mm.: 109–112° C.; M.P. of the hydrochloride 114–115° C.

3′-diethylaminopropyl ester, B.P. 0.05 mm.: 126–129° C.; M.P. of the hydrochloride 114–116° C.

The following ester of 2-(3′,4′-dimethylphenyl)-3-methyl-pentanoic acid can be produced in analogous manner:

2′-diethylaminoethylester, B.P. 0.02 mm.: 128–131° C.; M.P. of the hydrochloride 121–122° C.

The following esters of 2-thienyl-3-methylpentanoic acid can be produced in analogous manner:

2′-diethylaminoethyl ester, B.P. 0.06 mm.: 119° C.; M.P. of the hydrochloride 102–103° C., of the methobromide 74–75° C.

3′-diethylaminopropyl ester, B.P. 0.04 mm.: 130–132° C.; M.P. of the hydrochloride 109–110° C.

1′-methyl-piperidinol-(4′)-ester, B.P. 0.02 mm.: 120–123° C.; M.P. of the methobromide 122–123° C.

While the invention has been described with reference to various examples and embodiments, it will be apparent to those skilled in the art that various modifications may be made, and equivalents substituted therefor, without departing from the principles and true nature of the present invention.

We claim:

1. 2-phenyl-3-methyl-pentanoic acid-1′-methyl-piperidyl-(4′) ester.

2. 2-phenyl-3-methyl-pentanoic acid-1'-methyl-piperidyl-(4') ester methobromide.

3. 2-phenyl-3-methyl-pentanoic acid-1'-ethyl-piperidyl-(4') ester.

4. 2-(thienyl-2')-3-methyl pentanoic acid-1''-methyl-piperidyl-(4'') ester.

5. A compound selected from the class consisting of esters of the formula

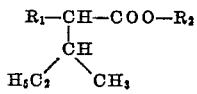

wherein $R_1$ is a radical selected from the class consisting of the phenyl radical and the thienyl-(2) radical and $R_2$ is a member of the group consisting of N-alkyl pyrrolidyl and N-alkyl piperidyl, the alkyl radicals of which are members of the group consisting of methyl and ethyl; the therapeutically useful acid addition salts thereof; and the therapeutically useful methyl quaternary ammonium salts thereof.

6. 2-phenyl-3-methyl-pentanoic acid-1'-methyl-piperidyl-(4')-ester methosulfate of the formula

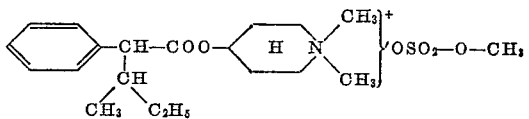

References Cited in the file of this patent
UNITED STATES PATENTS

| | | |
|---|---|---|
| 2,538,793 | Moffett | Jan. 23, 1951 |
| 2,538,794 | Moffett | Jan. 23, 1951 |
| 2,541,634 | Blicke | Feb. 13, 1951 |
| 2,655,511 | Woodruff | Oct. 13, 1953 |

FOREIGN PATENTS

| | | |
|---|---|---|
| 913,178 | Germany | June 10, 1954 |

OTHER REFERENCES

Moffett et al.: Journal of Organic Chemistry, volume 15, pages 343–358.